US010028250B2

(12) United States Patent
Nory et al.

(10) Patent No.: US 10,028,250 B2
(45) Date of Patent: Jul. 17, 2018

(54) INTERFERENCE MITIGATION IN AN ACCESSORY FOR A WIRELESS COMMUNICATION DEVICE

(75) Inventors: Ravikiran Nory, Buffalo Grove, IL (US); Ravi Kuchibhotla, Gurnee, IL (US); Robert T. Love, Barrington, IL (US); Vijay Nangia, Algonquin, IL (US); Kenneth A. Stewart, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 756 days.

(21) Appl. No.: 13/193,872

(22) Filed: Jul. 29, 2011

(65) Prior Publication Data
US 2013/0028200 A1    Jan. 31, 2013

(51) Int. Cl.
| H04W 72/00 | (2009.01) |
| H04B 7/00 | (2006.01) |
| H04B 10/564 | (2013.01) |
| H04W 72/02 | (2009.01) |
| H04L 1/08 | (2006.01) |
| H04W 52/04 | (2009.01) |
| H04W 28/04 | (2009.01) |

(52) U.S. Cl.
CPC ............ *H04W 72/02* (2013.01); *H04L 1/08* (2013.01); *H04W 28/04* (2013.01); *H04W 52/04* (2013.01)

(58) Field of Classification Search
CPC ........ H04L 1/08; H04W 72/02; H04W 28/048
USPC ........ 455/450, 509, 522, 423; 370/329, 252, 370/350, 503, 344; 73/579, 592; 381/315; 704/500
See application file for complete search history.

(56) References Cited

U.S. PATENT DOCUMENTS

| 4,512,194 A * | 4/1985 | Beuter ............................ 73/579 |
| 5,557,969 A * | 9/1996 | Jordan ............................ 73/592 |
| 7,773,943 B2 | 8/2010 | Zurek et al. |

(Continued)

FOREIGN PATENT DOCUMENTS

| WO | 2010055201 A1 | 5/2010 |
| WO | 2010/064842 A2 | 6/2010 |
| WO | 2011051981 A1 | 5/2011 |

OTHER PUBLICATIONS

3GPP TSG RAN WG1 #44, R1-060618 "Hearing Aid Compatibility (HAC) of VoIP over HSPA" Cingular Wireless, Denver, Colorado, Feb. 13-17, 2006, 3 pages.

(Continued)

*Primary Examiner* — Alpus H Hsu
*Assistant Examiner* — Camquyen Thai
(74) *Attorney, Agent, or Firm* — Faegre Baker Daniels LLP

(57) ABSTRACT

A method in a wireless communication terminal includes receiving configuration signaling for transmitting on a first set of radio resources wherein transmitting only on the first set of radio resources leads to a time-domain periodic repetitive pattern of transmissions from the terminal in a transmission interval that causes interference to a companion device communicably coupled to the wireless communication terminal. The terminals selects a second set of radio resources for transmitting on in the transmission interval such that transmissions on a combination of the second set of radio resources and the first set of radio resources does not lead to a periodic repetitive pattern of transmissions from the terminal in the transmission interval.

15 Claims, 5 Drawing Sheets

(56) References Cited

U.S. PATENT DOCUMENTS

| | | |
|---|---|---|
| 8,050,202 B2 | 11/2011 | Ishii et al. |
| 2007/0009124 A1* | 1/2007 | Larsen ................. H04R 25/554 381/315 |
| 2007/0009125 A1 | 1/2007 | Frerking et al. |
| 2007/0213046 A1* | 9/2007 | Li et al. ......................... 455/425 |
| 2007/0291797 A1* | 12/2007 | Rao ....................... H04L 1/1887 370/503 |
| 2008/0075109 A1 | 3/2008 | Zangi |
| 2008/0161037 A1* | 7/2008 | Rayzman ............. H04B 1/3805 455/552.1 |
| 2009/0003305 A1 | 1/2009 | Gerstenberger et al. |
| 2009/0010240 A1* | 1/2009 | Papasakellariou .... H04L 5/0007 370/344 |
| 2009/0111477 A1* | 4/2009 | Tsutsui ................. H04L 1/1887 455/450 |
| 2009/0197631 A1* | 8/2009 | Palanki et al. ................ 455/522 |
| 2010/0054512 A1* | 3/2010 | Solum ................. H04R 25/554 381/315 |
| 2011/0081865 A1* | 4/2011 | Xiao .................. H04W 52/243 455/63.1 |
| 2011/0105135 A1* | 5/2011 | Krishnamurthy et al. ... 455/450 |
| 2011/0117947 A1* | 5/2011 | Ishii et al. .................... 455/509 |
| 2011/0237243 A1* | 9/2011 | Guvenc ................ H04L 5/0032 455/423 |
| 2011/0237270 A1* | 9/2011 | Noh et al. ..................... 455/450 |
| 2011/0275394 A1* | 11/2011 | Song et al. .................... 455/509 |
| 2011/0275406 A1* | 11/2011 | Yang ...................... H01Q 1/243 455/550.1 |
| 2011/0292823 A1* | 12/2011 | Barbieri ................ H04L 5/0057 370/252 |
| 2012/0040676 A1 | 2/2012 | Jang et al. |
| 2012/0082047 A1* | 4/2012 | Wu ..................... H04W 72/082 370/252 |
| 2012/0101824 A1* | 4/2012 | Chen ....................... G10L 19/26 704/500 |
| 2012/0213096 A1* | 8/2012 | Krishnamurthy et al. ... 370/252 |
| 2012/0329400 A1* | 12/2012 | Seo et al. ...................... 455/63.1 |
| 2013/0064099 A1* | 3/2013 | Kim et al. .................... 370/241 |
| 2013/0121290 A1* | 5/2013 | Kim et al. .................... 370/329 |

OTHER PUBLICATIONS

European Patent Office; Extended European Search Report; EP Application No. 12175402.2; dated Jul. 22, 2015.

* cited by examiner

INTERFERENCE MITIGATION IN AN ACCESSORY FOR A WIRELESS COMMUNICATION DEVICE

FIELD OF THE DISCLOSURE

The present disclosure relates generally to wireless communications and, more particularly, to interference mitigation in an accessory or companion device or system subject to interference from periodic transmissions by a wireless communication device or terminal.

BACKGROUND

In some wireless communication systems, periodic radio transmissions by a wireless communication terminal interfere with a companion device or accessory. In $3^{rd}$ Generation Partnership Project (3GPP) Long term Evolution (LTE) Frequency Division Duplex (FDD) systems, for example, periodic physical uplink control channel (PUCCH), sounding reference signals (SRS) and physical uplink shared channel (PUSCH) transmissions, among others, from user equipment (UE) may create or cause interference in an associated hearing aid device or other EM-coupled devices, such as speakerphones, entertainment systems or public address systems. Transmissions on other wireless communication systems may cause similar interference. Generally, the severity of the interference depends on a many factors including the design of the victim system and coupling efficiency to the aggressor terminal. The most significant factors relevant to the interference from the perspective of aggressor terminal transmitter waveform design include: UE operating power; a difference between "ON" power of the UE when transmitting and "OFF" power of the UE when not transmitting; transition time and transition power profile (power vs. time) between and ON and OFF power levels; and the periodicity or more generally activity pattern, of the ON/OFF transitions. For LTE Time Division Duplex (TDD) systems in particular, dynamically scheduled PUSCH transmissions and ACK/NACK transmissions from the UE can also cause interference to the companion device or system due to the inherent uplink transmission periodicity introduced by the uplink/downlink (UL/DL) split (e.g., for the 8 DL+1 SS (special subframe): 1 UL subframe configuration with 1 ms subframes, the UE's UL transmissions are sent only for 1 ms every 10 ms).

U.S. Publication No. 2009/0003305 entitled "Method And Arrangement in a Telecommunication System" discloses mitigation of interference in non-UMTS audio equipment caused by bursty or intermittent transmissions. In US 2009/0003305, interference is reduced by introducing a randomization mechanism into the mapping of function of data packets onto the Hybrid Automatic Repeat Request (HARQ) processes, which in turn are mapped onto predefined subframes. Alternatively, US Publication No. 2009/0003305 discloses reducing interference by permuting HARQ transmission occasions without randomizing the selection of the HARQ process.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
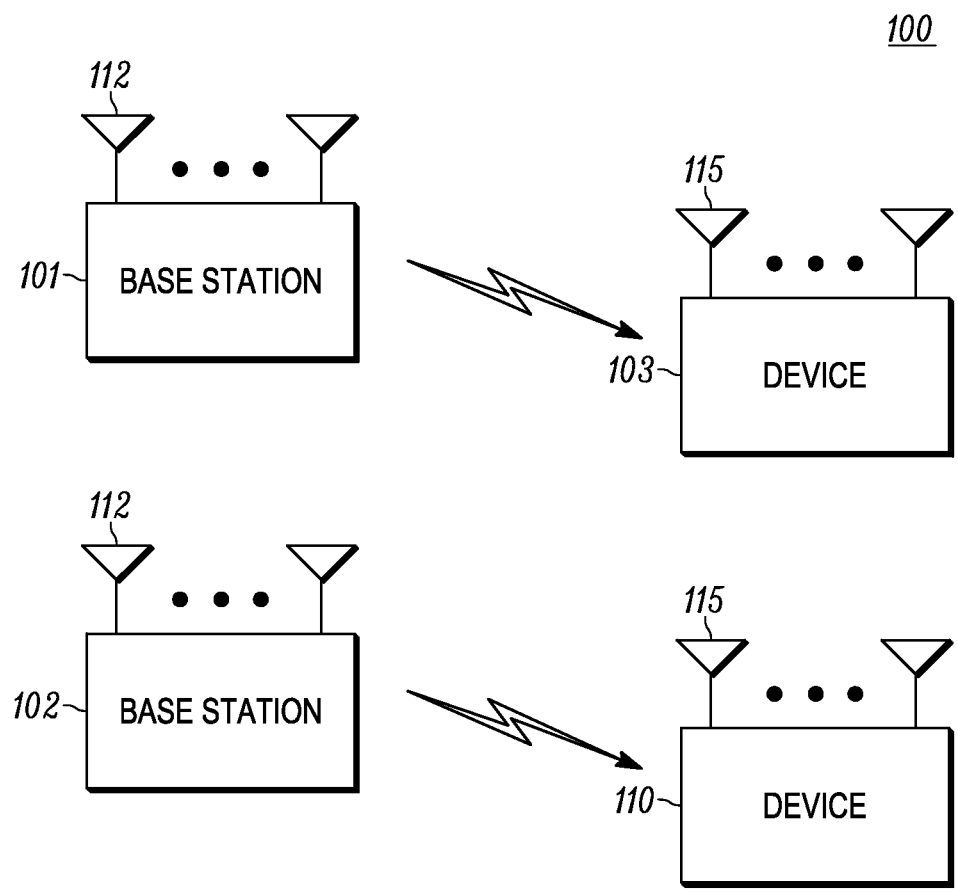
FIG. 1 illustrates a wireless communication system.

In FIG. 1, a wireless communication system 100 comprises multiple cell serving base units forming a communications network distributed over a geographical region. A base unit may also be referred to as a base station, an access point (AP), access terminal (AT), Node-B (NB), enhanced Node-B (eNB), relay node, or by other once, present or future terminology used in the art. The one or more base units 101 and 102 serve a number of remote units 103 and 110 within a serving area or cell or within a sector thereof. The remote units may be fixed units or mobile terminals. The remote units may also be referred to as subscriber units, mobile units, users, terminals, subscriber stations, user equipment (UE), user terminals, wireless communication terminal, wireless communication device or by other terminology used in the art. The network base units communicate with remote units to perform functions such as scheduling the transmission and receipt of information using radio resources. The wireless communication network may also comprise management functionality including information routing, admission control, billing, authentication etc., which may be controlled by other network entities. These and other aspects of wireless networks are known generally by those having ordinary skill in the art.

In FIG. 1, base units 101 and 102 transmit downlink communication signals to remote units 103 and 110 on radio resources, which may be in the time, and/or frequency and/or spatial domain. The remote units communicate with the one or more base units via uplink communication signals. The one or more base units may comprise one or more transmitters and one or more receivers that serve the remote units. The number of transmitters at the base unit may be related, for example, to the number of transmit antennas 112 at the base unit. When multiple antennas are used to serve each sector to provide various advanced communication modes, for example, adaptive beam-forming, transmit diversity, transmit SDMA, and multiple stream transmission, etc., multiple base units can be deployed. These base units within a sector may be highly integrated and may share various hardware and software components. For example, a base unit may also comprise multiple co-located base units that serve a cell. The remote units may also comprise one or more transmitters and one or more receivers. The number of transmitters may be related, for example, to the number of transmit antennas 115 at the remote unit.

In one implementation, the wireless communication system is compliant with the 3GPP Universal Mobile Telecommunications System (UMTS) Long Term Evolution (LTE) protocol, also referred to as EUTRA, wherein the base unit transmits using an orthogonal frequency division multiplexing (OFDM) modulation scheme on the downlink and the user terminals transmit on the uplink using a single carrier frequency division multiple access (SC-FDMA) or a Discrete Fourier Transform spread OFDM (DFT-SOFDM)

scheme. In yet another implementation, the wireless communication system is compliant with the 3GPP Universal Mobile Telecommunications System (UMTS) LTE-Advanced protocol, also referred to as LTE-A or some later generation or release of LTE wherein the base unit transmits using an orthogonal frequency division multiplexing (OFDM) modulation scheme on a single or a plurality of downlink component carriers and the user terminals can transmit on the uplink using a single or plurality of uplink component carriers. More generally the wireless communication system may implement some other open or proprietary communication protocol, for example, WiMAX, among other existing and future protocols. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division and/or spatial division multiplexing/multiple access techniques, or a combination of these various techniques. In alternative embodiments, the wireless communication system may utilize other communication system protocols including, but not limited to, TDMA or direct sequence CDMA. The communication system may be a TDD (Time Division Duplex) or FDD (Frequency Division Duplex) system. The disclosure is not intended to be implemented in any particular wireless communication system architecture or protocol.

Figure 2:
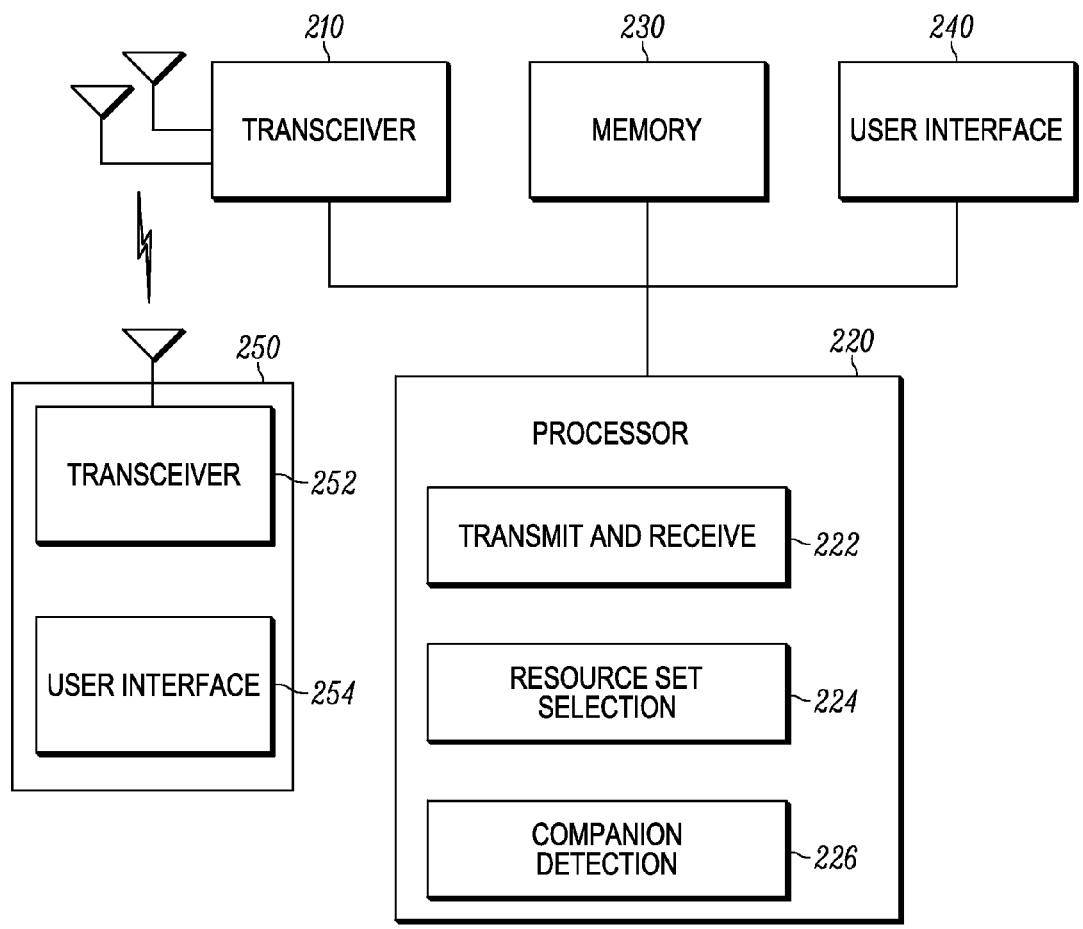
FIG. 2 illustrates a schematic block diagram of a wireless communication device and a companion accessory.

FIG. 2 illustrates a schematic block diagram of a wireless communication device 200 comprising generally a wireless transceiver 210 configured to communicate pursuant to a wireless communication protocol examples of which are discussed. The wireless transceiver 210 is representative of a first transceiver that communicates pursuant to a first wireless communication protocol and possibly a second transceiver that communicates pursuant to a second wireless communication protocol. In one embodiment, the first protocol is a cellular communication protocol like 3GPP LTE or some other known or future wireless protocols examples of which were described above. The second protocol is any protocol suitable for communicating with a companion device, examples of which are described further below. In some embodiments, the wireless transceiver 210 may not require the second transceiver or the second wireless communication protocol for communicating with a companion device such as a hearing aid device. The hearing aid device may simply pick up sounds from the wireless communication device by means of a microphone and amplify the sounds to make them louder providing accessibility for hearing aid users.

In FIG. 2, the transceiver 210 is communicably coupled to a processor 220 that includes functionality 222 that controls the transmission and reception of information by the one or more transceivers. The functionality of the controller is readily implemented as a digital processor that executes instructions stored in memory 230, which may be embodied as firmware or software stored in a memory device. When implemented as a user terminal or User Equipment (UE), the device 200 also includes a user interface 240 that typically includes tactile, visual and audio interface elements as is known generally by those having ordinary skill in the art. Other aspects of the terminal 200 that pertain to the instant disclosure are described further below.

In FIG. 2, the wireless communication device 200 is communicably coupled to a companion device 250 by one of the transceivers represented by element 210. For this purpose, the companion device 250 includes a wireless transceiver 252 that communicates with the transceiver of the wireless communication device 200. In some, but not all possible instantiations, the companion device includes a user interface 254, the characteristics of which are dependent on the nature or type of companion device. In one embodiment, the companion device is embodied as a hearing aid device. A hearing aid would include at least an audio output. In some embodiments, a hearing aid device may include an audio input as in the case of a cell phone head-set used for hand-free operation of a communication device like a cellular telephone. In other embodiments, the companion device is embodied as some other electromagnetically coupled device, such as a speakerphone, an entertainment system, a public address (PA) system, etc. The companion device could also be a medical device. Such a medical device could be a wearable device or near-contact device that monitors physiological characteristics of a person and transmits corresponding physiological data to the wireless communication device. Alternatively, the medical device could also be some other device that receives physiological data detected by the wireless communication device in proximity to the person. Various open and proprietary communication protocols are known to enable communication between a companion device and a wireless communication device including but not limited to Bluetooth, infrared (e.g., IrDA), IEEE 801.11 among others. The disclosure is not intended to be limited to any particular protocol for communications between the wireless communication and companion devices.

According to one aspect of the disclosure, transmission by a first transceiver of the wireless communication device only on a first set of radio resources leads to a time-domain periodic repetitive pattern of transmissions in a transmission interval that cause interference to the operation of the companion device. In one implementation such a transmission occurs in a 3GPP LTE compliant transceiver of the UE. The transmission in the first set of radio resources could include the transmission of control information or data. The transmission in the first set of radio resources generally occurs within a carrier bandwidth assigned to the wireless communication terminal. In the system of FIG. 1, the assignment would be made by a base unit, or an eNB in the context of the exemplary 3GPP LTE implementation.

Figure 4A:
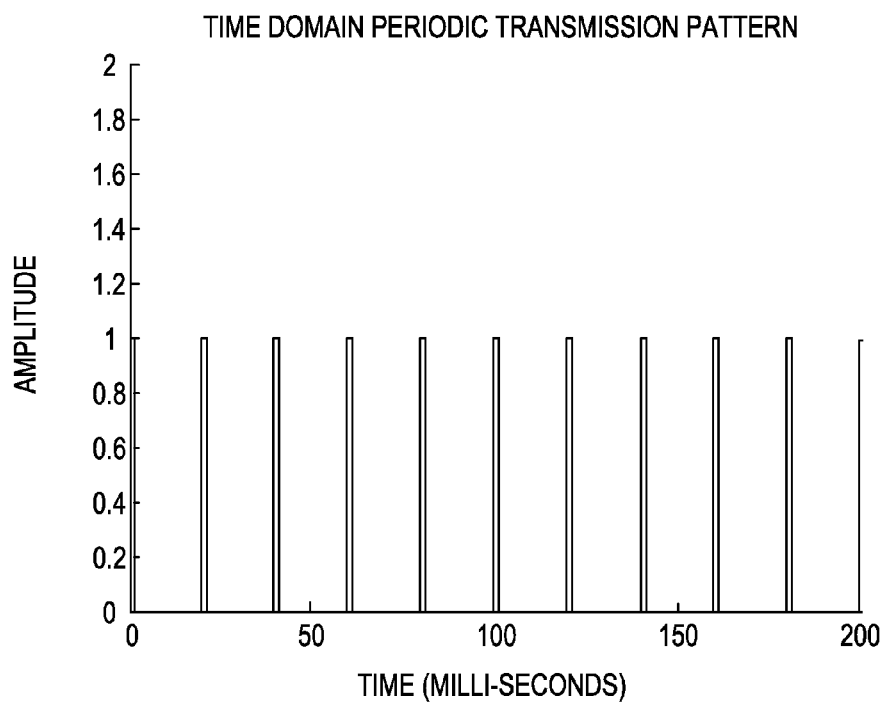
FIGS. 4a and 4B illustrate a time domain repetitive periodic transmissions from a wireless communication device that causes interference to a communicably coupled to a companion device.
Figure 4B:
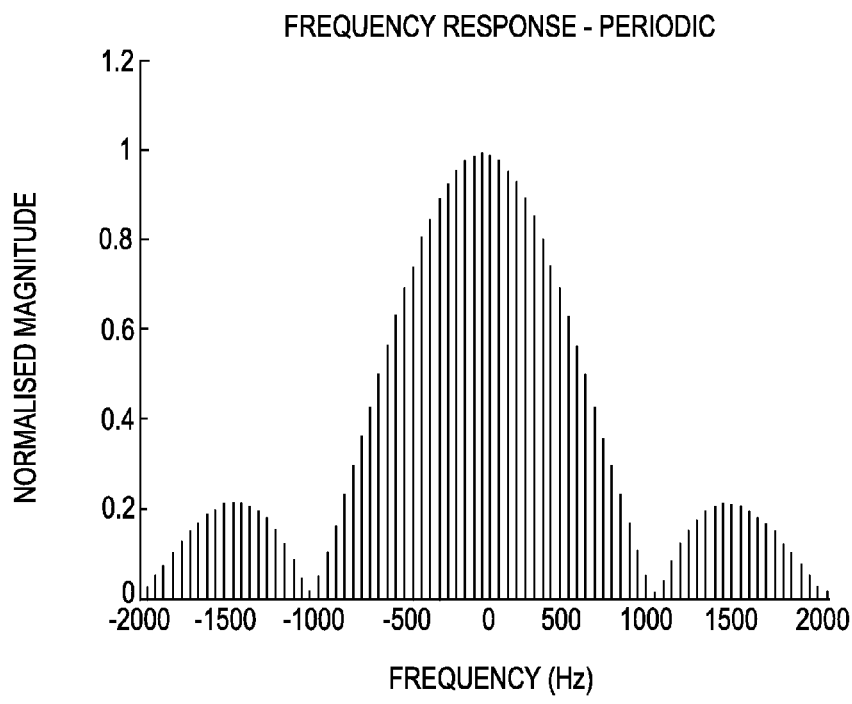

FIGS. 4A and 4B shows one example of a time domain periodic repetitive pattern of transmissions created when a LTE UE or wireless communication terminal is transmitting PUSCH using Semi-persistent scheduling (SPS). SPS is typically used for supporting Voice over Internet Protocol (VoIP) transmissions from the UE. FIG. 4A illustrates the UE transmitting a voice packet for a 1 ms subframe every 20 ms. A transmission interval of 200 ms is shown. Typically the voice packets are transmitted in transmission intervals corresponding to 2 to 3 second talk spurts. In FIG. 4A, the transmission pattern of the UE periodically repeats every 20 ms with a 1 ms 'ON duration' (the subframe where the UE is transmitting the voice packet) and a 19 ms 'OFF duration' (the subframe where the UE is not transmitting). UE transmission power during the ON duration depends on a various factors including power control commands received from the eNB and path loss between the UE and eNB. In LTE, the transmission power of the ON duration transmissions can be as high as 200 mW (23 dBm). In LTE, the ON duration transmissions typically occur on a set of resource blocks (RBs) assigned to the UE by the eNB within the UE's carrier bandwidth. The ON/OFF transmission pattern by the UE causes distinct frequency domain peaks (or spurs) that fall within the audible frequency range (typically 20 Hz to 20 kHz) as shown in FIG. 4B. Due to these spurs the time domain periodic repetitive pattern of transmissions by the UE interfere with the operation of companion devices (such as a hearing aid) by corrupting the audio output of the companion device. In some embodiments, the hearing aid companion device detect radio-frequency fields radiated by the UE and amplify the detected interference signals from the UE in the audio frequency range resulting in undesirable sound from the hearing aid. While the example in FIGS. 4A and 4B considers the case where the UE is transmitting in the ON duration and not transmitting in the OFF duration, other scenarios where the UE is transmitting at a high power during the ON duration and a low power during the OFF duration also create a periodic time domain repetitive pattern causing interference to companion devices.

Figure 3:
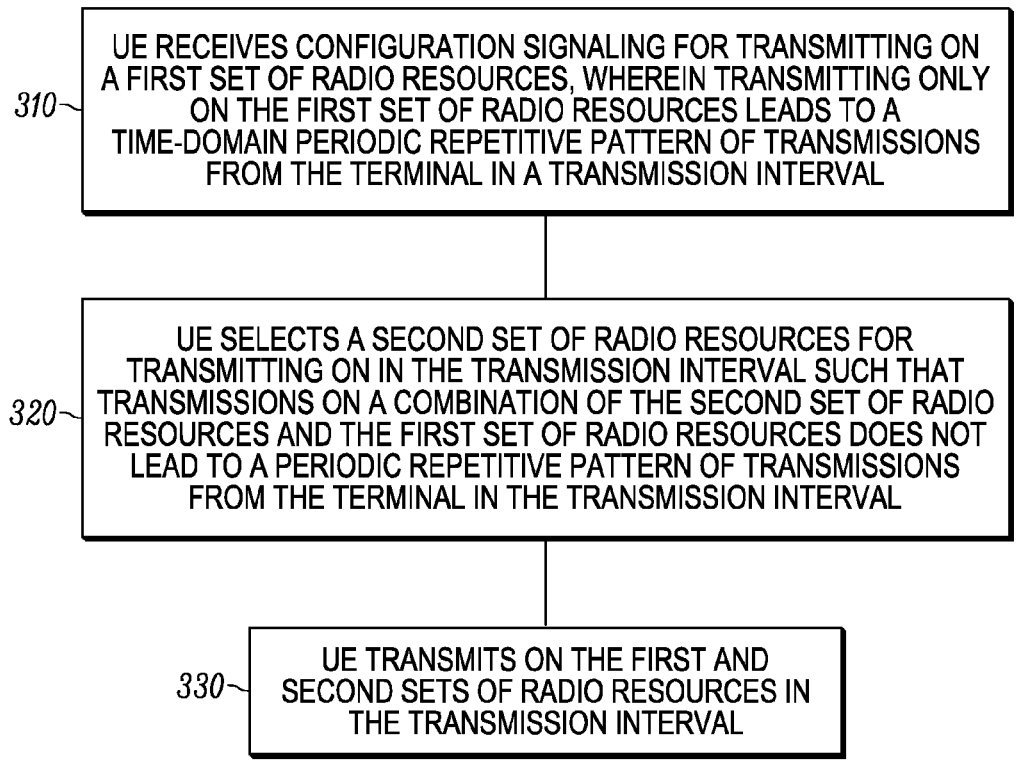
FIG. 3 is a process flow diagram.

In the process diagram 300 of FIG. 3, at 310, the wireless communication terminal receives configuration signaling for transmitting on a first set of radio resources. In the system of FIG. 1, the signaling would be from the base unit, or eNB in the context of the exemplary 3GPP LTE implementation. For example, in LTE, the first set of radio resources can comprise a set of RBs (typically 2 or 3 RBs within the UEs carrier bandwidth) in every 20th subframe within a transmission interval for which SPS is activated at the UE. In another example, the first set of radio resources can comprise a set of RBs in every $10^{th}$ subframe where the UE transmits periodic CQI within a transmission interval for which the UE is configured by the eNB for periodic CQI reporting. In another example, the first set of radio resources can comprise a set of RBs in every $10^{th}$ subframe where the UE transmits periodic SRS (sounding reference signal) within a transmission interval for which the UE is configured by the eNB for periodic SRS transmission. As noted above, an assumption is that if the UE transmitted only on the first set of radio resources, the transmission would lead to a time-domain periodic repetitive pattern of transmissions from the UE in or during a corresponding transmission interval and that such a transmission would interfere with the operation of the companion device communicably coupled to the UE.

In one implementation, the wireless communication terminal or UE can store details of multiple transmission configurations that can lead to time-domain periodic repetitive pattern of transmissions from the UE that cause interference to companion devices. When the UE receives configuration signaling from the eNB to perform uplink transmissions on a first set of radio resources, it can check whether the configuration signaling from the eNB matches one of the stored transmission configurations to determine if transmissions using only the first set of radio resources leads to a time-domain periodic repetitive pattern that interferes with a companion device associated with the UE. For example, a UE can store possible periodicities (or periodicity ranges) and power levels (or power level thresholds) that lead to transmissions that cause interference to companion devices. If the UE receives configuration signaling from the eNB to transmit on a first set of radio resources with a periodicity that matches a stored periodicity value and at a power level that exceeds a stored power level value, UE determines that transmission on the first set of radio resources leads to a time-domain periodic repetitive pattern of transmissions and that such a transmission would interfere with the operation of the companion device communicably coupled to the UE. Alternately, the UE can detect the onset of a particular data traffic pattern, for example, the onset of a voice call that can lead to time domain periodic repetitive pattern of transmissions that can potentially cause interference to a companion device. In an alternate embodiment, the UE may include functionality (e.g., circuitry and/or software) to detect and estimate the severity of the radio-frequency fields radiated by the UE in the audible frequency range transmission and thus enabling the UE to determine that the transmission would interfere with the operation of the companion device communicably coupled to the UE.

In one implementation where the companion device is an audio device, the periodic repetitive pattern of the first set of radio resources has a periodicity rate or a multiple of the periodicity rate, e.g., harmonics, in an audible frequency range associated with an audio output of the companion device. The pattern or harmonics give rise to interference to companion devices having an audio output, e.g., hearing aid devices, speakerphone systems, audio entertainment systems, public address systems, among other audio accessories.

In FIG. 3, at 320, the wireless communication terminal selects a second set of radio resources for transmitting during the transmission interval. The second set of radio resources is selected such that transmissions on a combination of the second set of radio resources and the first set of radio resources in the same transmission interval does not lead to a periodic repetitive pattern of transmissions from the terminal in that transmission interval. In one embodiment, the second set of radio resources are selected such that the second set of radio resources are distinct from the first set of radio resources in time domain. In FIG. 2, the controller of the UE 200 includes second resource set selection functionality 224. This functionality may be implemented upon execution of firmware or software by the controller 220. Alternatively, this functionality may be implemented by equivalent hardware circuits or a combination of hardware and software.

In an embodiment where the periodic repetitive pattern of the first set of radio resources has a periodicity rate or a multiple of the periodicity rate in an audible frequency range associated with the companion device, the second set of radio resources is selected in a manner that reduces the periodicity rate or a multiple of the periodicity rate in the audible frequency range of the resulting transmitted waveform in the time domain.

In one embodiment, the UE selects the second set of radio resources from a candidate set of radio resources. In the exemplary 3GPP LTE implementation, the candidate set of radio resources is a set of frequency domain resource blocks, wherein the set of frequency domain resource blocks includes one or multiple resource blocks in some or all sub-frames in the transmission interval. In the 3GPP LTE implementation, the candidate set of radio resources received from the eNB includes information identifying the set of frequency domain resource blocks. In one embodiment, the second set of radio resources are selected such that the second set of radio resources has a pseudo-random transmission pattern in the time domain. In another embodiment, the second set of radio resources are selected such that the combination of the first and second set of radio resources have a pseudo-random pulse structure for the transmission signal pattern in the time domain. In an alternative embodiment, the second set of radio resources are selected such that the second set of radio resources is a subset of a candidate set of radio resources. In yet another alternative embodiment, the selected second set of radio resources can include all the resources in the candidate set of radio resources. In yet another alternative embodiment, the size of the selected set of radio resources may vary in time and/or the transmission power on the selected set of radio resources may vary in time.

The candidate set of radio resources may be received from the base station. In one particular embodiment, the information identifying the candidate set of radio resources is received by the wireless communication terminal in a system information block (SIB) transmitted by the base station. Alternatively, the information identifying the candidate set of radio resources is received in a Radio Resource Configuration (RRC) message. In one embodiment, regardless of the transmission mechanism, the information identifying the candidate set of radio resources, received from the base station, includes information identifying a semi-persistently scheduled Physical Uplink Shared Channel (PUSCH) resource periodically occurring in the transmission interval.

Figure 5A:
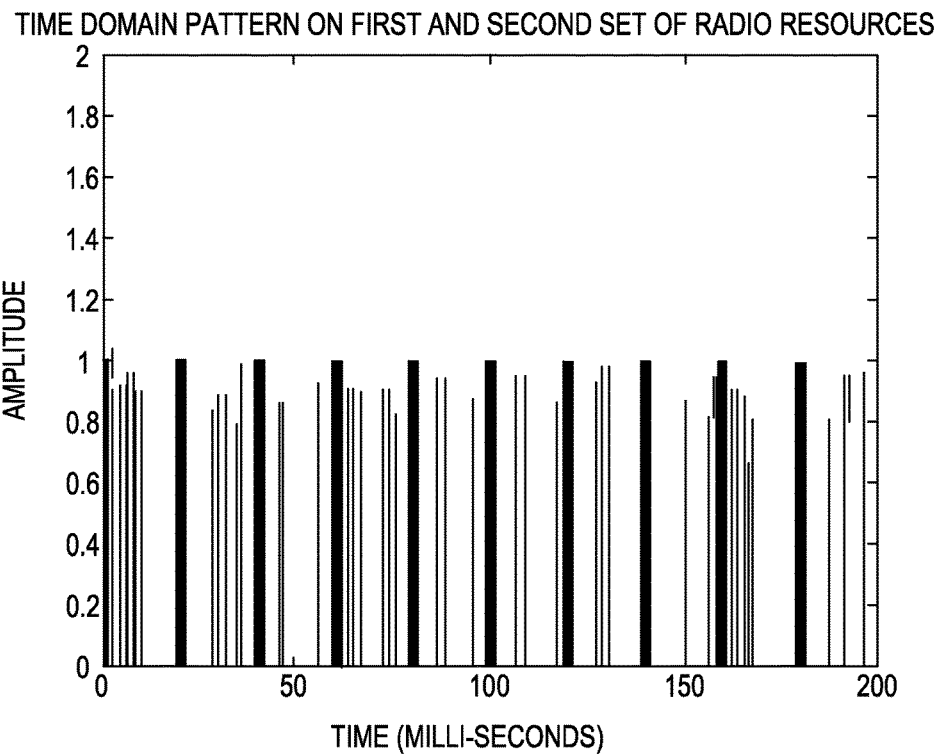
FIGS. 5A and 5B illustrate a transmission that does not lead to a time domain periodic repetitive pattern of transmissions from the wireless communication device.
Figure 5B:
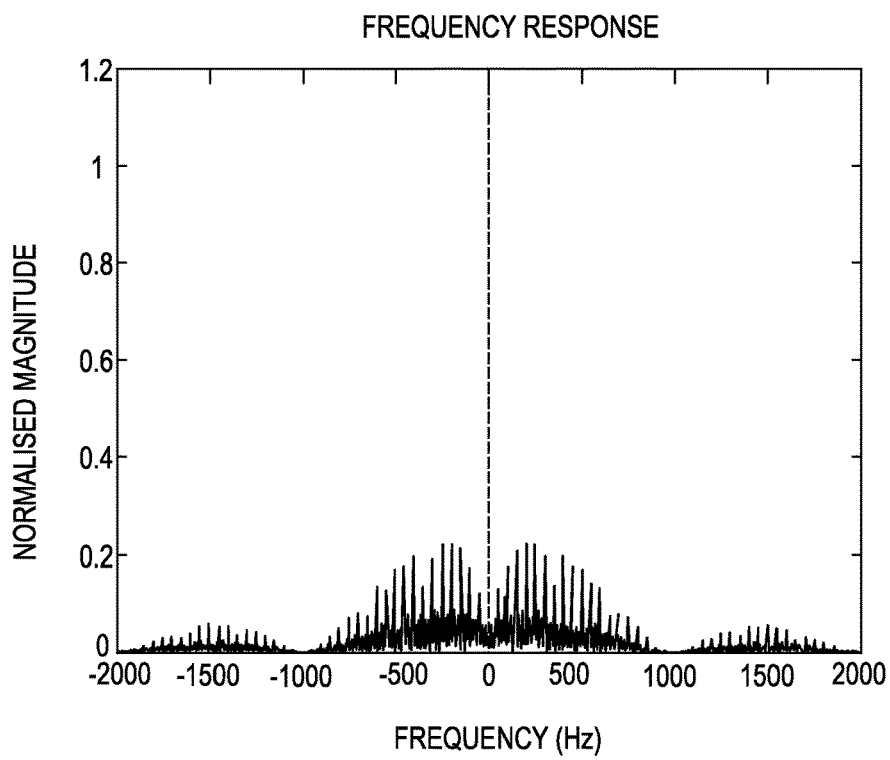

FIGS. 5A and 5B consider an example where the UE is configured by the eNB to transmit voice packets in a set of RBs (e.g., RB0 and RB1) in every 20th 1 ms subframe during a 1 second transmission interval (only the first 200 ms are shown). RB0 and RB1 in every 20th subframe during the 1 second transmission interval can be considered as the first set of radio resources. The UE determines that transmission on RB0 and RB1 every 20th subframe leads to a time-domain periodic repetitive pattern that would interfere with the operation of a companion device communicably coupled to the UE. The UE can additionally receive signaling from the eNB indicating that a particular RB (e.g., RB2) in every subframe during the 1 second transmission interval can be used for transmission by the UE. RB2 in every subframe during the 1 second transmission interval can be considered as the candidate set of radio resources The UE then selects four additional subframes every 20 ms during the 1 second transmission interval on which it can transmit on RB2. RB2 in the selected four additional subframes every 20 ms during the 1 second transmission interval can be considered as the second set of radio resources. The combination of transmissions by the UE in the first and second set of radio resources leads to an ON/OFF transmission pattern whose frequency domain peaks in the audible frequency range are much less pronounced as shown in FIG. 5B.

The information identifying the candidate set of radio resources received from the base station can include an RB index or a set of RB indices and optionally, the number of subframes or a time duration for which the candidate set of radio resources may be used. The information may additionally include uplink component carrier indentifying information such as a component carrier index identifying the carrier for the candidate set of radio resources. Alternatively, information identifying the candidate set of radio resources can include a Physical Uplink Control Channel (PUCCH) resource index. The PUCCH resource index can be identified using a "delta^PUCCH_shift" value, a "n^(2)_PUCCH" value or a "n^(1)_PUCCH" value. The PUCCH resource index can also be identified using a "Scheduling Request (SR) resource" value or a combination of the SR resource value and one or more of the values described above, all of which can be signaled by the base station. In another embodiment, the candidate set of radio resources may be periodic SRS resources and the information identifying the candidate set of radio resources can include sounding reference signal (SRS) resource configuration information such as periodicity, subframe offset, comb, cyclic shift, bandwidth etc. The candidate set of radio resources may be considered a common resources where one or more UEs may transmit on the resources simultaneously.

In FIG. 3, at 330, the UE transmits on the first and the second set of radio resources in the same transmission interval. The first set of radio resources are transmitted within a carrier bandwidth assigned to the wireless communication terminal and the second set of radio resources are transmitted outside of the assigned carrier bandwidth. In one embodiment, the wireless communication terminal may be configured and activated for a plurality of uplink component carriers, with the first set of radio resources on a first component carrier and the second set of radio resources on a second component carrier. In another embodiment, a UE with multiple transmit antenna ports, may transmit on the first of radio resources with a first antenna port and transmit on the second of radio resources with a second antenna port. The first and second antenna ports may be physically separate antennas or may correspond to spatially different antenna patterns/response. Thus configured and operated, transmissions by the wireless communication device are less likely to interfere with the companion device.

In one embodiment, transmission on the second set of resources is conditioned on the presence of the companion device. The wireless communication terminal may detect the presence of the companion device communicably coupled to the wireless communication terminal. The detection may be based on a mode of the wireless communication terminal or activity in the companion device. The mode of the wireless communication terminal may include activation of a configuration setting in the wireless communication terminal to indicate the presence of the companion device. The activation of the configuration setting may be a result of turning "ON" the setting by the user of the wireless communication terminal, or in response to a sensor such as an RFID sensor detecting the presence of a companion device, or in response to receiving a configuration signalling from the base station based on user-associated information in network. The activity in the companion device may include power "ON" of the companion device, transmission and/or reception activity from the companion device. In one embodiment, the wireless communication device may detect the presence of the companion device by receiving a transmission from the companion device. According to this variation, the UE transmits in the second set of radio resources only when the companion device has been detected. The UE may also condition the selection of the second set of radio resources on the presence of the companion device. In FIG. 2, the controller of the UE 200 includes companion detection functionality 226 for this purpose. This functionality may be implemented upon execution of firmware or software by the controller 220. Alternatively, this functionality may be implemented by equivalent hardware circuits or a combination of hardware and software.

In one embodiment, the network base station allocates or makes available a dummy resource in a fashion possibly responsive to signaling from the UE indicating a companion, e.g., a hearing aid companion (HAC) mode is operational. Alternatively, the dummy resource is allocated in response to user-associated information in network storage, e.g., a home location register (HLR), that is broadcasted to some or all UEs in the cell that require a resource to mitigate interference to the companion device. According to this aspect of the disclosure the UE transmissions in the second set of resources include transmitting dummy information. This information is not intended to be decoded by a receiving entity. Dummy transmissions from the UE in active mode can be characterized as those transmissions that the network is not required or expected to decode. The transmission occurrence (whether the UE transmits on configured HAC resource block(s)) in a subframe is determined by the UE and is not dynamically scheduled (using PDCCH with CRC scrambled with C-RNTI or TC-RNTI) by the network. Resources for dummy transmission may be semi-persistently scheduled but can be a common resource that any of the UEs could transmit on (and at the same time resulting in collisions if reception was attempted) and would not be used by each UE to reliably communicate data packets of a particular data flow or flows (e.g., voice, video streaming, web browsing . . . ) to the network; nor could it be used to reliably transmit control information like CQI/PMI/RI, SRS, SR, PHR, buffer occupancy. The transmission type used by the UE on the resource for dummy transmission could be determined by a MIB/SIB field, or could be specified, or could be a special set of resources optimized such that the periodic repetitive time domain pattern of transmissions from the UE are disrupted or the transmission type may be left up to the UE. Alternatively, a set of specific PRACH locations in frequency and time could be configured for the UE to transmit a 'fake' RACH preamble on but this would be inefficient since each RACH occupies 6 RBs. A special PRACH could be defined with fewer RBs to avoid this problem. Alternatively, SR could be over provisioned to allow for 'fake' SR transmissions (i.e., the SR transmission doesn't reflect UEs buffer occupancy) or a common SR resource could be defined for multiple UEs to transmit ('fake' SR). If the resources used for dummy transmission were to be used for transferring control information (e.g., CQI/PMI/RI or SRS or PHR or buffer occupancy) then some means would be needed to orthogonalize the transmissions (e.g., use of different cyclic time shits offsets or orthogonal codes and subframes, etc.) and this would likely be an inefficient use of resources to achieve reliable communication.

In one embodiment, the otherwise problematic uplink transmission from the UE is made quasi-continuous by transmitting in the second set of radio resources. According to this aspect of the disclosure, the UE transmissions in or on the first and second set of radio resources during the transmission interval includes making quasi-continuous transmissions. Such a quasi-continuous uplink transmission may also have some or all of the following characteristics: low frequency components of the RF power spectrum (or spectrum resulting from a transformation of the RF power spectrum, such as low-pass filtering or rectifying functions) of these transmissions fall inside a range of frequencies (e.g., inside the audio range of 20 Hz-20000 Hz; transmit power difference between ON period and OFF period is smaller than X dB, wherein the value of X depends on a number of number of factors including the design of the victim system; a transition time between the ON period and OFF period is larger than Y microseconds, where the value of Y can depend on a number of factors. More generally, the trajectory over time of the ON-OFF (or OFF-ON) transitions are appropriately shaped.

The candidate set of radio resources on which the UE(s) can transmit can have one or more of the following characteristics or may use one or more of the following methods:

(1) The candidate set of radio resources can be semi-persistently scheduled (SPS);

(2) The details of the candidate set of radio resources (i.e., time-frequency-code radio resource descriptor) may be broadcast by the eNB. Any UE can transmit on the resource or only some UE's may be configured to transmit on the resource. Such UEs may be eligible by group, including e.g., the group of Hearing Aid Compatibility (HAC) capable, or HAC-active devices (i.e., where a user has manually initiated HAC operation, or a sensor such as an RFID sensor or other sensor type has initiated HAC operation);

(3) The candidate set of radio resources can be allocated in the frequency domain (i.e., a resource block (RB) or a set of RBs for dithering in certain subframes) or in the time domain (dummy OFDM symbol for transition waveform shaping);

(4) The descriptors of the candidate set of radio resources may be part of SIBs;

(5) The candidate set of radio resources can comprise part of guard period (in TDD);

(6) The candidate set of radio resources can be part of a carrier segment/extension carrier when operating in a multi-carrier network.

Such candidate set of radio resources are preferentially made available in the time-domain so that the UE can avoid "OFF" transmit power periods or can control transitions between ON and OFF periods or control the amplitude modulation component of the transmissions. Alternatively, transmissions in the second set of radio resources selected from the candidate set of radio resources may comprise transmissions derived from selecting a lower encoding rate, including repeat coding, permitting the base station to combine such transmissions. This may be executed under base station scheduler control. The UE may autonomously elect to use certain resources without interaction with the network or base station scheduler, or at the direction of either such entity. In addition to avoiding "OFF" periods, lower code rate transmissions may permit reduced radiated power levels, but may increase power consumption due to prolonged transmitter activity. Alternatively, transmissions in the second set of radio resources selected from the candidate set of radio resources may comprise transmissions that repeat data sent in the first set of radio resources.

In additional embodiments, the UE and eNB may negotiate a companion device accommodating communication configuration in response to the UE indicating to the network that it is associated with a hearing aid or other companion device. Examples of a companion device accommodating communication configuration include:

(1) UE backing off its uplink transmit power by X dB, wherein X can be pre-specified or signaled to the UE via RRC. Alternatively, the UE may autonomously modify a reported power headroom value to reduce maximum power. The power back off can be applied to all uplink physical and/or logical channels or applied selectively to a subset of such channels (e.g., PUCCH, SPS) or applied selectively to only those cases where the UE determines that a time domain periodic repetitive pattern of transmissions is created;

(2) UE may be permitted to use relaxed or elevated minimum transmit power requirements where the UE's transmissions during the "OFF duration" are allowed to be within Y1 dB of a previously scheduled/configured transmission, or Y1 dB above a specified absolute value. Such a relaxation of the UE's minimum transmit power may be constrained to occur only during specified intervals of time or, more generally, on specific radio resources including time, frequency or code resources. Y1 can be pre-specified or signaled to the UE via RRC or it may be autonomously selected by the UE. The relaxed requirement can be applied to all uplink physical and/or logical channels or to a subset of such channels (e.g., PUCCH, SPS) or only in those cases when the transmissions or potential transmissions from the UE lead to a time domain periodic repetitive pattern.

(3) UE may be configured by eNB to perform TTI-bundling wherein the UE transmits information in multiple sets of subframe instead on in the same subframe. This allows the UE to lower its transmission power and thereby reduce interference to the associated companion device.

In an alternative embodiment, the UE transmits dummy scheduling requests (SRs) to modify an undesirable PUCCH waveform or any uplink waveform periodicity. This alternative may not be efficient from a radio resource perspective since uplink (UL) resources are wasted. Also, since PUCCH SR resources are optionally configured by the network, a UE not configured with an SR resource cannot utilize this option.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication terminal, the method comprising:
   receiving, from a base station, configuration signaling for transmitting on a first set of radio resources;
   accessing stored data representative of information, including one or both of periodicities or power levels, that lead to transmissions that cause interference to a companion device communicably coupled to the wireless communication terminal;
   determining, based on the accessed data, whether transmitting only on the first set of radio resources leads to a time-domain periodic repetitive pattern of transmissions from the wireless communication terminal in a transmission interval that causes interference to the companion device;
   selecting a second set of radio resources for transmitting in the transmission interval such that transmissions on a combination of the second set of radio resources and the first set of radio resources does not lead to the time-domain periodic repetitive pattern of transmissions from the wireless communication terminal in the transmission interval if it is determined that transmitting only on the first set of radio resources leads to the time-domain periodic repetitive pattern of transmissions from the wireless communication terminal; and
   transmitting on the first and the second set of radio resources in the transmission interval, wherein transmitting in the second set of resources includes transmitting dummy information that is not intended to be decoded by an entity receiving the dummy information.

2. The method of claim 1:
   wherein transmitting in the first set of radio resources includes transmitting control information or data.

3. The method of claim 1 further comprising:
   receiving, from a base station, information identifying a candidate set of radio resources; and
   selecting the second set of radio resources from the candidate set of radio resources.

4. The method of claim 3 wherein receiving information identifying the candidate set of radio resources includes receiving information identifying a set of frequency domain resource blocks.

5. The method of claim 3 wherein the information identifying the candidate set of radio resources is received by the wireless communication terminal in a system information block transmitted by the base station.

6. The method of claim 3 wherein the information identifying the candidate set of radio resources includes information identifying a semi-persistently scheduled Physical Uplink Shared Channel resource periodically occurring in the transmission interval received from the base station.

7. The method of claim 3 wherein the information identifying the candidate set of radio resources includes a Physical Uplink Control Channel resource index received from the base station.

8. The method of claim 3 wherein selecting the second set of radio resources from the candidate set of radio resources includes selecting the second set of radio resources such that the second set of radio resources have a pseudo-random transmission pattern in the time domain.

9. The method of claim 3 wherein selecting the second set of radio resources from the candidate set of radio resources includes selecting the second set of radio resources such that the second set of radio resources is a subset of the candidate set of radio resources.

10. The method of claim 1:
    wherein transmitting in the first set of radio resources includes transmitting within a carrier bandwidth assigned to the wireless communication terminal; and
    wherein transmitting in the second set of radio resources includes transmitting outside of the assigned carrier bandwidth.

11. The method of claim 1 further comprising:
    detecting the presence of the companion device communicably coupled to the wireless communication terminal; and
    transmitting in the second set of radio resources only when the presence of the companion device has been detected.

12. The method of claim 1 further comprising selecting the second set of radio resources such that the second set of radio resources are distinct from the first set of radio resources in time domain.

13. The method of claim 1 wherein the time-domain periodic repetitive pattern of the first set of radio resources has a periodicity rate or a multiple of the periodicity rate in an audible frequency range.

14. The method of claim 13 wherein selecting the second set of radio resources from the candidate set of radio resources includes selecting resources from the candidate set of radio resources to reduce the periodicity rate or the multiple of the periodicity rate in an audible frequency range of a resulting transmitted waveform in the time domain.

15. The method of claim 1 further comprising transmitting, by the wireless communication terminal to the base station, information indicating detection of the companion device before transmitting in the second set of radio resources.

* * * * *